(12) United States Patent
Krueger et al.

(10) Patent No.: US 11,467,330 B1
(45) Date of Patent: Oct. 11, 2022

(54) ONE BEAM MIRROR MAGNETO-OPTICAL TRAP CHAMBER

(71) Applicant: Government of the United States, as represented by the Secretary of the Air Force, Kirtland AFB, NM (US)

(72) Inventors: Adam J. Krueger, Houghton, MI (US); Isaac B. McMahon, Pittsburgh, PA (US); Matthew Squires, Sandia Park, NM (US)

(73) Assignee: Government of the United States as represented by the Secretary of the Air Force, Kirtland AFB, OH (US)

( * ) Notice: Subject to any disclaimer, the term of this patent is extended or adjusted under 35 U.S.C. 154(b) by 539 days.

(21) Appl. No.: 16/656,212

(22) Filed: Oct. 17, 2019

Related U.S. Application Data

(60) Provisional application No. 62/749,224, filed on Oct. 23, 2018.

(51) Int. Cl.
  *G02B 5/30* (2006.01)
  *G01J 3/02* (2006.01)

(52) U.S. Cl.
  CPC ............ *G02B 5/3083* (2013.01); *G01J 3/021* (2013.01)

(58) Field of Classification Search
  CPC ........ G02B 5/3083; G01J 3/021; G01J 3/0224
  USPC .......... 359/280–283, 489.07, 489.15, 489.17
  See application file for complete search history.

(56) References Cited

U.S. PATENT DOCUMENTS

| | | | |
|---|---|---|---|
| 5,528,028 A | 6/1996 | Chu et al. | |
| 6,303,928 B1 | 10/2001 | Buell et al. | |
| 6,476,383 B1 | 11/2002 | Esslinger et al. | |
| 6,495,822 B2 | 12/2002 | Hirano et al. | |
| 6,635,867 B2 | 10/2003 | Kajita | |
| 6,680,473 B2 | 1/2004 | Ohmukai et al. | |
| 7,030,370 B1 | 4/2006 | Crookston et al. | |
| 7,081,623 B2 | 7/2006 | Pai et al. | |
| 7,126,112 B2 | 10/2006 | Anderson et al. | |
| 7,470,971 B2 | 12/2008 | McBride | |
| 7,709,807 B2 | 5/2010 | McClelland et al. | |
| 7,965,147 B2 | 6/2011 | Strabley et al. | |

(Continued)

FOREIGN PATENT DOCUMENTS

| | | |
|---|---|---|
| CN | 1928615 A | 3/2007 |
| CN | 200950173 Y | 9/2007 |

(Continued)

*Primary Examiner* — Ricky D Shafer
(74) *Attorney, Agent, or Firm* — AFNWC/JA; David L. Narciso

(57) ABSTRACT

A magneto-optical trap chamber includes a first waveplate; a second waveplate; a first mirror positioned between the first waveplate and the second waveplate; a prism extending from the first mirror and positioned between the first waveplate and the second waveplate; and a second mirror positioned under the first waveplate, the second waveplate, the first mirror, and the prism. The second mirror may include a direct bonded copper (DBC) chip. The first waveplate and the second waveplate may be parallel to each other. The first mirror may be orthogonal to each of the first waveplate and the second waveplate. The prism may have a first end and a second end, wherein the first end is connected to the first mirror, and the second end is connected to the second mirror. The prism may extend from the first mirror to the second mirror at an acute angle.

20 Claims, 5 Drawing Sheets

(56) References Cited

U.S. PATENT DOCUMENTS

| | | | |
|---|---|---|---|
| 8,080,778 B2 | 12/2011 | McBride | |
| 8,237,105 B1 | 8/2012 | Bulatowicz et al. | |
| 8,309,909 B2 | 11/2012 | Dikovsky et al. | |
| 8,405,021 B2 | 3/2013 | Anderson et al. | |
| 8,546,748 B2 | 10/2013 | Hughes et al. | |
| 8,835,833 B2 | 9/2014 | Du et al. | |
| 8,853,613 B1 | 10/2014 | Compton et al. | |
| 9,086,429 B1 | 7/2015 | Biedermann et al. | |
| 9,117,563 B2 | 8/2015 | Hughes et al. | |
| 9,285,249 B2 | 3/2016 | Schober et al. | |
| 9,291,508 B1 | 3/2016 | Biedermann et al. | |
| 9,410,885 B2 | 8/2016 | Schober et al. | |
| 9,763,314 B1 | 9/2017 | Roper et al. | |
| 9,897,448 B2 | 2/2018 | Johnson et al. | |
| 9,960,025 B1 | 5/2018 | Hughes | |
| 9,960,026 B1 | 5/2018 | Hughes | |
| 10,278,275 B2 | 4/2019 | Imhof | |
| 2017/0372808 A1* | 12/2017 | Gill | G01B 9/02015 |
| 2019/0148028 A1* | 5/2019 | Ravenhall | G21K 1/006 250/251 |
| 2019/0187198 A1* | 6/2019 | Anderson | G01R 29/0878 |

FOREIGN PATENT DOCUMENTS

| | | |
|---|---|---|
| CN | 104036841 B | 9/2014 |
| CN | 105117774 B | 12/2015 |
| CN | 106782739 B | 5/2017 |
| KR | 101617297 B1 | 5/2016 |

\* cited by examiner

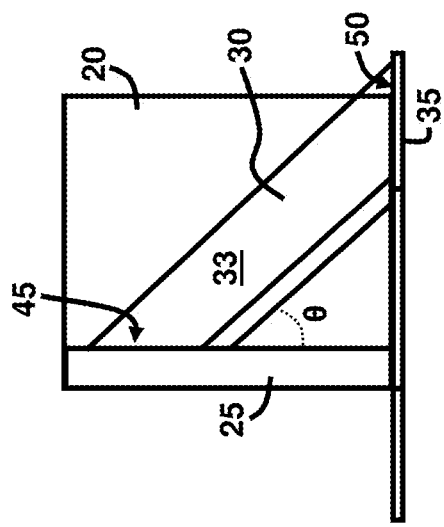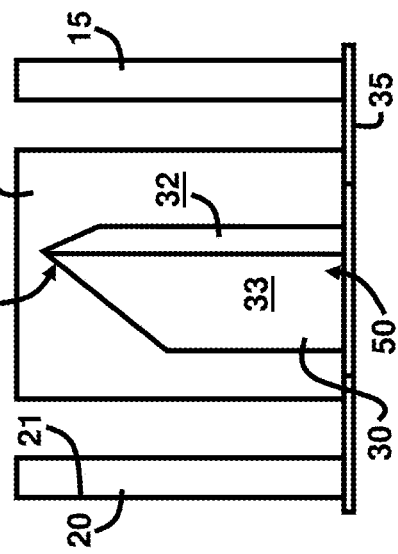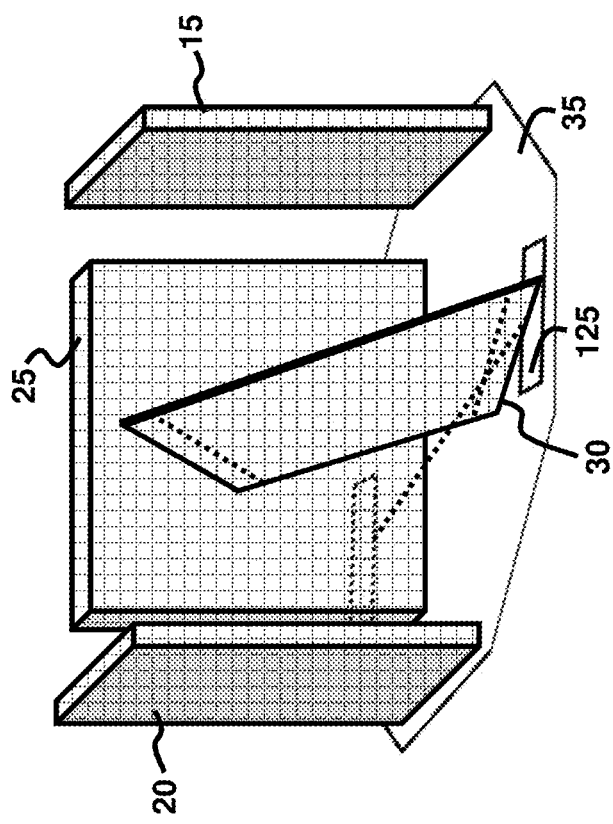

ONE BEAM MIRROR MAGNETO-OPTICAL TRAP CHAMBER

CROSS-REFERENCE TO RELATED APPLICATION(S)

This application claims the benefit of U.S. Provisional Patent Application No. 62/749,224 filed on Oct. 23, 2018, which is incorporated herein by reference in its entirety.

GOVERNMENT INTEREST

The invention described herein may be manufactured and used by or for the Government of the United States for all government purposes without the payment of any royalty.

BACKGROUND

Field of the Invention

The embodiments herein generally relate to optics technology, and more particularly to a magneto-optical trap chamber to optically hold and observe atoms.

Background of the Invention

Magneto-optical trap chambers are essential in the operation of most systems involving cold atoms. In this field, an element is chosen for use or observation, often by its energy states. The lasers are then tuned to the frequency corresponding to the transition energy between two energy levels, which is the mechanism by which a viscous force known as "optical molasses" functions. Once these atoms are held in the magneto-optical trap chamber at an extremely low temperature, they can be used for many applications. Currently, magneto-optical trap chambers are used for basic physics research, state-of-the-art optical clock timing, state-of-the-art optical inertial sensing and navigation, and Bose-Einstein Condensates, among other applications.

Conventional magneto-optical trap chambers have a typical volume of at least 70 cubic centimeters, and typically require the use of a second magneto-optical trap chamber with optical molasses in only two axes to 'feed' rubidium atoms into the primary magneto-optical trap chamber. Furthermore, the conventional magneto-optical trap chambers typically require the use of five separate lasers; two for the two-dimensional magneto-optical trap chamber and three for the main three-dimensional magneto-optical trap chamber, one for each axis. Additionally, atoms manipulated by atom chips, in this instance by DBC atoms chips, generally require proximity of the laser-cooled atoms to the atom chip.

BRIEF SUMMARY OF THE INVENTION

In view of the foregoing, an embodiment herein provides a magneto-optical trap chamber comprising a first waveplate; a second waveplate spaced apart from the first waveplate; a first mirror positioned between the first waveplate and the second waveplate; a prism extending from the first mirror and positioned between the first waveplate and the second waveplate; and a second mirror positioned under the first waveplate, the second waveplate, the first mirror, and the prism. The first waveplate may comprise a quarter-waveplate. The first waveplate may be configured to polarize light. The second waveplate may comprise a quarter-waveplate. The second waveplate may comprise a reflective surface. The second mirror may comprise a direct bonded copper (DBC) chip. The first waveplate and the second waveplate may be parallel to each other. The first mirror may be orthogonal to each of the first waveplate and the second waveplate. A longitudinal axis of the prism may be parallel to each of the first waveplate and the second waveplate. The longitudinal axis of the prism may be orthogonal to the first mirror. The prism may comprise a first end and a second end, wherein the first end is connected to the first mirror, and wherein the second end is connected to the second mirror. The prism may extend from the first mirror to the second mirror at an acute angle. The prism may comprise an anti-reflective surface.

Another embodiment provides a system comprising a light source to generate a single input light beam; and a magneto-optical trap chamber to receive the single input light beam and generate six output light beams, wherein the magneto-optical trap chamber comprises a first waveplate to polarize the single input light beam; a second waveplate comprising a reflective surface and spaced apart from the first waveplate; a first mirror positioned between the first waveplate and the second waveplate; a prism extending from the first mirror and positioned between the first waveplate and the second waveplate; and a DBC chip comprising a second mirror positioned under the first waveplate, the second waveplate, the first mirror, and the prism. The prism may direct the single input light beam towards the first mirror and the second mirror. The system may further comprise an electric circuit operatively connected to the DBC chip. The DBC chip may comprise a wire that produces a gradient magnetic field when supplied with current from the electric circuit. The system may further comprise a vacuum pump attached to the magneto-optical trap chamber. The system may further comprise an alkali metal dispenser to regulate a flow of rubidium atoms to the magneto-optical trap chamber. The six output light beams may be generated by the selective dispersion of the single input light beam from the prism and reflected by the first mirror, the second mirror, and the second waveplate.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 3 is a schematic diagram illustrating a perspective view of the magneto-optical trap chamber of FIG. 1, according to an example;

FIG. 4 is a schematic diagram illustrating a side view of the magneto-optical trap chamber of FIG. 3, according to an example;

FIG. 5 is a schematic diagram illustrating a front view of the magneto-optical trap chamber of FIG. 3, according to an example;

DETAILED DESCRIPTION OF THE INVENTION

Figure 1:
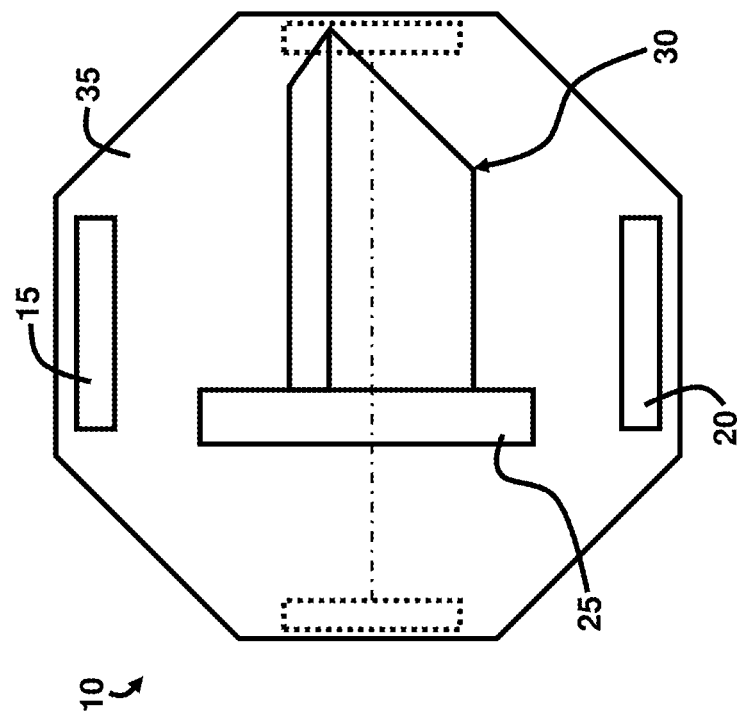
FIG. 1 is a schematic diagram illustrating a top view of a magneto-optical trap chamber, according to an example.
Figure 2:
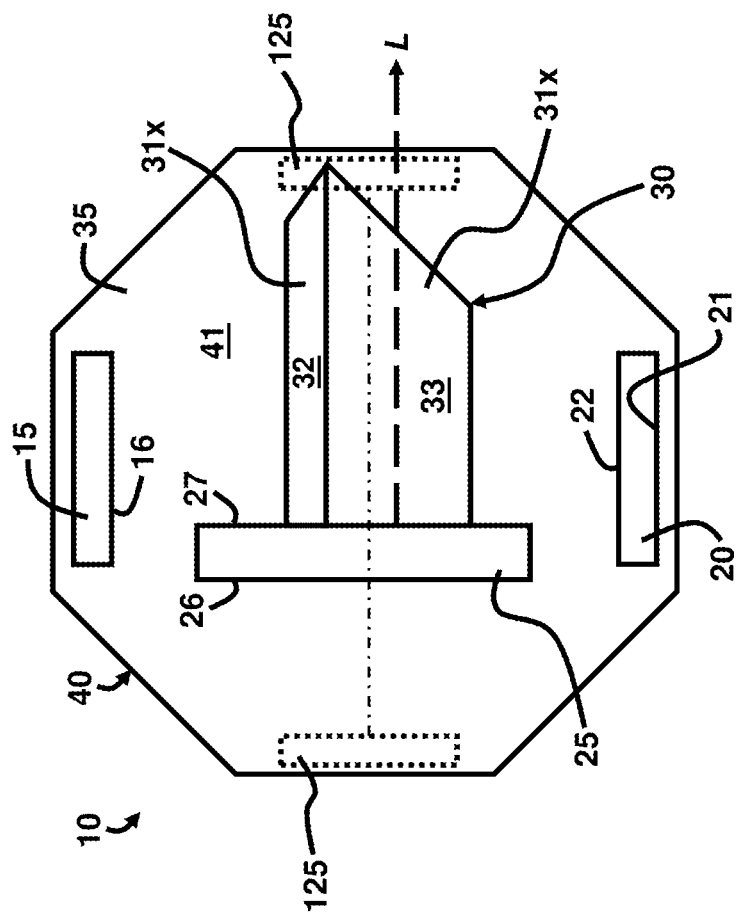
FIG. 2 is a schematic diagram illustrating another top view of a magneto-optical trap chamber, according to an example.
Figure 7:
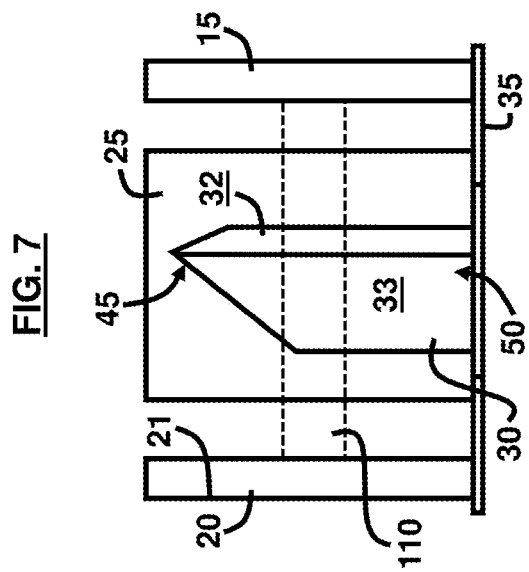
FIG. 7 is a schematic diagram illustrating a front view of the magneto-optical trap chamber of FIG. 6 showing an input light beam, according to an example.
Figure 6:
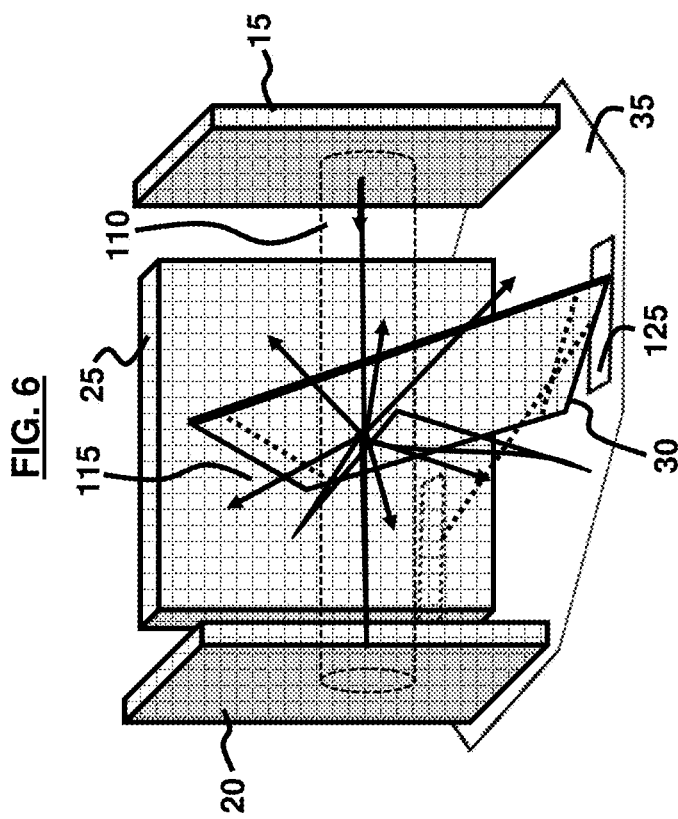
FIG. 6 is a schematic diagram illustrating a perspective view of the magneto-optical trap chamber of FIG. 1 showing input and output light beams, according to an example.

Embodiments of the disclosed invention, its various features and the advantageous details thereof, are explained more fully with reference to the non-limiting embodiments that are illustrated in the accompanying drawings and detailed in the following description. Descriptions of well-known components and processing techniques are omitted to not unnecessarily obscure what is being disclosed. Examples may be provided and when so provided are intended merely to facilitate an understanding of the ways in which the invention may be practiced and to further enable those of skill in the art to practice its various embodiments. Accordingly, examples should not be construed as limiting the scope of what is disclosed and otherwise claimed.

It will be understood that when an element or layer is referred to as being "on", "connected to", or "coupled to" another element or layer, it may be directly on, directly connected to, or directly coupled to the other element or layer, or intervening elements or layers may be present. In contrast, when an element or layer is referred to as being "directly on", "directly connected to", or "directly coupled to" another element or layer, there are no intervening elements or layers present. It will be understood that for the purposes of this disclosure, "at least one of X, Y, and Z" may be construed as X only, Y only, Z only, or any combination of two or more items X, Y, and Z (e.g., XYZ, XYY, YZ, ZZ).

The embodiments herein provide a one beam mirror magneto-optical trap chamber that is part of a larger device that is used to optically hold and observe atoms at a very low temperature. The chamber itself forms a magneto-optical trap (MOT) using a laser and a gradient magnetic field produced by a chip made of a Direct Bonded Copper Substrate (DBC). The chamber is configured to receive a circularly polarized laser beam and direct it via mirrors and quarter-waveplates to propagate in both directions in three orthogonal axes with correct polarization. This laser is tuned to a specific transition frequency of the trapped atoms, which in this case is rubidium but it may be any laser cooled atomic, molecular, or composite particle. When active, this optical structure exerts a viscous force known as "optical molasses" that acts against the velocity of any atoms within its cross-section. When combined with the gradient field produced by the DBC chip, the atoms are trapped within the cross-section of the optical molasses and are thus kept in place to be used or observed. The chamber uses only one input laser and utilizes mirrors, quarter-waveplates, and a DBC shutter chip to replace the other four lasers required by the conventional systems and techniques. As mentioned, in conventional solutions, atoms manipulated by atom chips, in this instance by DBC atoms chips, generally require proximity of the laser-cooled atoms to the atom chip. Conversely, the embodiments herein permit an input single beam to a mirror configuration that allows the atoms to be trapped in close proximity (i.e., less than 1 mm) to the mirror on the DBC atom chip.

Referring now to the drawings, and more particularly to FIGS. 1 through 8, where similar reference characters denote corresponding features consistently throughout, there are shown exemplary embodiments. In the drawings, the size and relative sizes of components, layers, and regions, etc. may be exaggerated for clarity.

FIG. 1 illustrates a magneto-optical trap chamber 10 comprising a first waveplate 15 and a second waveplate 20 spaced apart from the first waveplate 15. The first waveplate 15 and the second waveplate 20 may comprise a similar material or may be composed of different materials from one another. In some examples, the first waveplate 15 and the second waveplate 20 may comprise a birefringent material of suitable thickness to linearly polarize a light beam that is directed therethrough. Some examples of birefringent materials include quartz, mica, plastic, and borosilicate glass. The first waveplate 15 and the second waveplate 20 may be spaced apart from one another at any suitable distance, and the first waveplate 15 and the second waveplate 20 may comprise any suitable size and configuration.

The magneto-optical trap chamber 10 comprises a first mirror 25 positioned between the first waveplate 15 and the second waveplate 20. The first mirror 25 may comprise any suitable type of mirror such as a plane mirror or non-plane mirror such as a spherical, parabolic, concave, or convex mirror, for example, as well as a neodymium-doped yttrium aluminum garnet; $Nd:Y_3Al_5O_{12}$ (Nd:YAG) laser mirror, laser line mirror containing a dielectric coating, and broadband dielectric laser mirror, among other types of mirrors. Additionally, the first mirror 25 may comprise any suitable shape and size, and in an example, the first mirror 25 may be longer and/or wider than the first waveplate 15 and the second waveplate 20. According to an example, the first mirror 25 is positioned to be spaced apart from both the first waveplate 15 and the second waveplate 20 and to be positioned substantially between the first waveplate 15 and the second waveplate 20. Moreover, the upper surfaces of the first mirror 25, the first waveplate 15, and the second waveplate 20 may be planar to each other or they may be different from one another, according to various examples.

The magneto-optical trap chamber 10 comprises a prism 30 extending from the first mirror 25 and positioned between the first waveplate 15 and the second waveplate 20. In an example, the prism 30 may comprise borosilicate glass and may comprise any suitable size or configuration. For example, the prism 30 may contain an irregular pentagon shape. The dimensions and configuration of the prism 30 may be dependent on three degrees of freedom: the height and width of the allowable magneto-optical trap cross-section and the thickness of the glass walls. According to an example, the prism 30 may have an elongated and angled structure that extends from the first mirror 25 in a cantilever manner. The prism 30 may be adhered to the first mirror 25 using glue, epoxy, or any other suitable bonding connection material or device.

According to an example, the prism 30 may have a volume of 2.2 cubic centimeters to provide a much more compact-sized device compared to the conventional magneto-optical traps. In other examples, the size of the prism 30 may be scaled on three degrees of freedom. Furthermore, the magneto-optical trap chamber 10 also has a much higher magneto-optical trap-to-volume ratio, meaning that much excess space is eliminated compared to the conventional chambers.

The magneto-optical trap chamber 10 comprises a second mirror 35 positioned under the first waveplate 15, the second waveplate 20, the first mirror 25, and the prism 30. The second mirror 35 may comprise any suitable shape and size. In an example, the second mirror 35 may be configured as a substantially flat octagonal-shaped plate having a thickness less than the thickness of any of the first waveplate 15, the second waveplate 20, the first mirror 25, and the prism 30. Moreover, the second mirror 35 may be configured to accommodate each of the first waveplate 15, the second waveplate 20, the first mirror 25, and the prism 30 thereon. In another example, the first waveplate 15 may be positioned offset and adjacent to the second mirror 35 such that the first waveplate 15 is not positioned on the second mirror 35. The first waveplate 15, the second waveplate 20, the first mirror 25, and the prism 30 may be adhered to the second mirror 35 using glue, epoxy, or any other suitable bonding connection material or device.

FIGS. 2 through 7, with reference to FIG. 1, illustrates other aspects of the magneto-optical trap chamber 10. In an example, the first waveplate 15 and the second waveplate 20 comprise a quarter-waveplate and may be made of crystalline materials. A light beam 110 comprises two polarization components along both axes having different polarization states. The first waveplate 15 and the second waveplate 20 have a relative phase, Γ, that is imparted on the two polarization components of the light beam 110. The relative phase, Γ, is related to the birefringence Δn and the thickness x of the birefringent crystal that constitutes the first waveplate 15 and the second waveplate 20, respectively. Equation (1) represents this relationship:

$$\Gamma = \frac{2\pi \Delta n x}{\lambda_0} \quad (1)$$

where $\lambda_0$ represents the vacuum wavelength of the light beam 110.

For a quarter-wave plate, as in the case of the first waveplate 15 and the second waveplate 20, the t, Δn, and $\lambda_0$ may be selected such that the phase shift between the polarization components light beam 110 is $\Gamma = \pi/2$. In an example, for a linearly polarized wave of the light beam 110 that is incident on the crystal (i.e., first waveplate 15 and second waveplate 20), the wave is represented by Equation (2):

$$(E_f \hat{f} + E_s \hat{s}) e^{i(kz-\omega t)} \quad (2)$$

where E is the electric field of the incident wave, $\hat{f}$ is the vector along the waveplate's (i.e., first waveplate 15 or second waveplate 20) fast axis, $\hat{s}$ is the vector along the waveplate's (i.e., first waveplate 15 or second waveplate 20) slow axis, k is the wave vector, z is the propagation axis of the wave, ω is the angular frequency, t is time, the f is the fast axis of the quarter-waveplate (i.e., first waveplate 15 or second waveplate 20), s is the fast axis of the quarter-waveplate (i.e., first waveplate 15 or second waveplate 20), and $E_f$ and $E_s$ are real. The quarter-waveplate (i.e., first waveplate 15 or second waveplate 20) creates a phase shift term $e^{i\Gamma} = e^{i\pi/2} = i$ between the f and s components of the wave. Therefore, the wave is represented by Equation (3) upon exiting the crystal and is now elliptically polarized:

$$(E_f \hat{f} + iE_s \hat{s}) e^{i(kz-\omega t)} \quad (3)$$

The axis of polarization of the incident wave may be selected so that it makes a 45° angle with each of the f and s axes of the quarter-waveplate (i.e., first waveplate 15 or second waveplate 20). Accordingly, $E_f = E_s = E$, and the resulting wave upon exiting the quarter-waveplate (i.e., first waveplate 15 or second waveplate 20) is represented by Equation (4), whereby the wave is circularly polarized:

$$E(\hat{f} + i\hat{s}) e^{i(kz-\omega t)} \quad (4)$$

Additionally, the axis of polarization of the incident wave may be selected so that it makes a 0° angle with each of the f and s axes of the quarter-waveplate (i.e., first waveplate 15 or second waveplate 20). Here, the polarization remains linear and does not change. Moreover, when the angle of the axis of polarization of the incident wave to each of the f and s axes of the quarter-waveplate (i.e., first waveplate 15 or second waveplate 20) is selected to be between 0° and 45°, then the resulting wave has an elliptical polarization.

According to other examples, the first waveplate 15 is configured to polarize light (i.e., light beam 110) and the second waveplate 20 comprises a reflective surface 21. In some examples, the reflective surface 21 may be configured as any suitable type and size of mirror such as a plane mirror or non-plane mirror such as a spherical, parabolic, concave, or convex mirror, for example, as well as a Nd:YAG laser mirror, laser line mirror containing a dielectric coating, and broadband dielectric laser mirror, among other types of mirrors. The first mirror 25 may comprise a substrate 26 with a reflective surface 27 coated thereon. For example, the substrate 26 may comprise glass and the reflective surface 27 may comprise thin layers of metals such as aluminum, silver, or metal oxides, for example. A light beam 110 is polarized through the first waveplate 15 and enters the prism 30, and then is reflected back into the prism 30 by the reflective surface 21 of the second waveplate 20.

The second mirror 35 comprises a direct bonded copper (DBC) chip 40. The DBC chip 40 may be a mechano-electric micro-system (MEMS) shutter chip, which permits rubidium atoms to travel from a source chamber to the magneto-optical trap chamber 10 when a small voltage is applied. This, alone, cuts the necessary space of the magneto-optical trap chamber 10 in half compared to the conventional chambers. The DBC chip 40 may be cut by engraving wire patterns into raw substrate material using a pulsed laser mill, for example. Once cut, the DBC chip 40 may be cleaned and polished using a lapping machine. Additionally, any number of additional procedures may be applied on the DBC chip 40 before it is finished. In an example, the DBC chip 40 may have a reflective coating applied on its face. In another example, the DBC chip 40 may have a through-hole and two 'vias', which are pits that extend from one side to the other side, but which does not extend all the way through the DBC chip 40. According to an example, the DBC chip 40 may be bonded to the first waveplate 15, second waveplate 20, first mirror 25, and prism 30 using glue, epoxy, or any other suitable bonding connection material or device. The DBC chip 40 may be engraved with a wire 125 on the inner face of the DBC chip 40, which produces a gradient magnetic field M required to form the magneto-optical trap when supplied with current. The DBC chip 40 may also comprise a reflective surface 41 thereby creating the second mirror 35. In some examples, the reflective surface 41 may be configured as any suitable type and size of mirror such as a plane mirror or non-plane mirror such as a spherical, parabolic, concave, or convex mirror, for example, as well as a Nd:YAG laser mirror, laser line mirror containing a dielectric coating, and broadband dielectric laser mirror, among other types of mirrors.

According to an example, the first waveplate 15 and the second waveplate 20 may be parallel to each other. According to another example, depending on the respective configurations of the first waveplate 15 and the second waveplate 20, the first waveplate 15 and the second waveplate 20 may be arranged to be non-parallel to each other; i.e., slightly angled to each other. Moreover, the first waveplate 15 and the second waveplate 20 may have the same length as each other or may be different. The first mirror 25 is orthogonal to each of the first waveplate 15 and the second waveplate 20. More specifically, the reflective surface 27 of the first mirror 25 is orthogonal to the longitudinal surfaces 16, 22 of the first waveplate 15 and the second waveplate 20, respectively.

In another example, a longitudinal axis L of the prism 30 is parallel to each of the first waveplate 15 and the second waveplate 20. More specifically, the longitudinal axis L of the prism 30 is parallel to the longitudinal surfaces 16, 22 of the first waveplate 15 and the second waveplate 20, respectively. Furthermore, the longitudinal axis L of the prism 30 is orthogonal to the first mirror 25. More specifically, the longitudinal axis L of the prism 30 is orthogonal to the reflective surface 27 of the first mirror 25. The prism 30 may comprise a plurality of angled walls 31x and an anti-reflective surface 32. The plurality of angled walls 31x may be configured at any suitable angle with respect to one another. In an example, the plurality of angled walls 31x form an irregular pentagon shape. The anti-reflective surface 32 may comprise a coating applied to selective walls of the plurality of angled walls 31x of the prism 30. Furthermore, the prism 30 may comprise a reflective surface 33 on one of the plurality of angled walls 31x.

The prism 30 comprises a first end 45 and a second end 50. The first end 45 is connected to the first mirror 25 and the second end 50 is connected to the second mirror 35. The first end 45 of the prism 30 may be adhered to the first mirror 25 using glue, epoxy, or any other suitable bonding connection material or device. Likewise, the second end 50 of the prism 30 may be adhered to the second mirror 35 using glue, epoxy, or any other suitable bonding connection material or device. The prism 30 may be composed of borosilicate glass pieces, which may be first rough cut using a diamond tile saw, for example, using a computer numerical control (CNC) mill. Once the pieces are cut and cleaned, they are polished with a lapping machine. In accordance with an example, the prism 30 extends from the first mirror 25 to the second mirror 35 at an acute angle θ. In an example, the angle θ is an approximately 45° angle.

Figure 8:
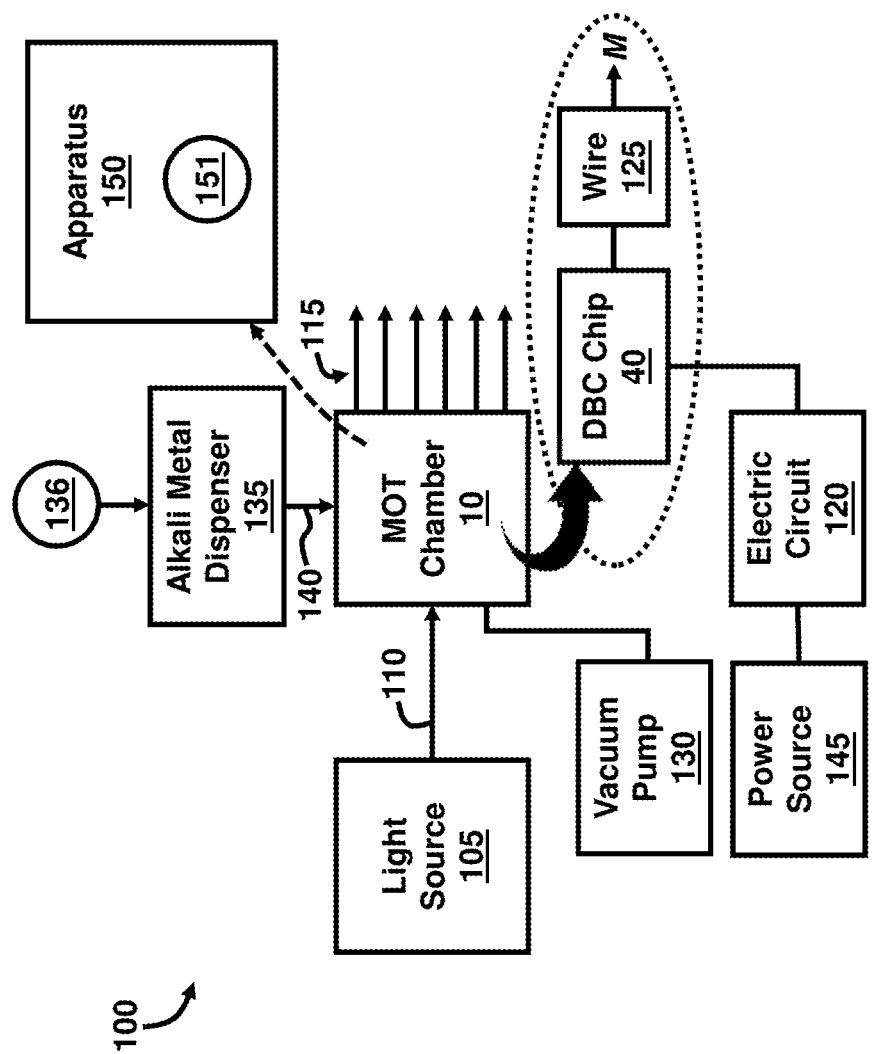
FIG. 8 is a block diagram illustrating a system for processing light beams, according to an example.

FIG. 8, with reference to FIGS. 1 through 7, is a block diagram of a system 100. According to an example, the system 100 comprises a light source 105 to generate a single input light beam 110. In some examples, the light source 105 may be a laser source and the single input light beam 110 may be a Nd:YAG laser. The system 100 further comprises a magneto-optical trap chamber 10 to receive the single input light beam 110 and generate six output light beams 115. The generation of the six output light beams 115 occur through the configuration and arrangement of the magneto-optical trap chamber 10. For example, the magneto-optical trap chamber 10 comprises a first waveplate 15 to polarize the single input light beam 110; a second waveplate 20 comprising a reflective surface 21 and spaced apart from the first waveplate 15; a first mirror 25 positioned between the first waveplate 15 and the second waveplate 20; a prism 30 extending from the first mirror 25 and positioned between the first waveplate 15 and the second waveplate 20; and a DBC chip 40 comprising a second mirror 35 positioned under the first waveplate 15, the second waveplate 20, the first mirror 25, and the prism 30. In an example, the prism 30 directs the single input light beam 110 towards a first mirror 25 and a second mirror 35 due to the angled configuration of the prism 30.

The first waveplate 15 and the second waveplate 20 may comprise a similar material or may be composed of different materials from one another. In some examples, the first waveplate 15 and the second waveplate 20 may comprise a birefringent material of suitable thickness to linearly polarize a light beam that is directed therethrough. Some examples of birefringent materials include quartz, mica, plastic, and borosilicate glass. The first waveplate 15 and the second waveplate 20 may be spaced apart from one another at any suitable distance, and the first waveplate 15 and the second waveplate 20 may comprise any suitable size and configuration.

The magneto-optical trap chamber 10 comprises a first mirror 25 positioned between the first waveplate 15 and the second waveplate 20. The first mirror 25 may comprise any suitable type of mirror such as a plane mirror or non-plane mirror such as a spherical, parabolic, concave, or convex mirror, for example, as well as a Nd:YAG laser mirror, laser line mirror containing a dielectric coating, and broadband dielectric laser mirror, among other types of mirrors. Additionally, the first mirror 25 may comprise any suitable shape and size, and in an example, the first mirror 25 may be longer and/or wider than the first waveplate 15 and the second waveplate 20. According to an example, the first mirror 25 is positioned to be spaced apart from both the first waveplate 15 and the second waveplate 20 and to be positioned substantially between the first waveplate 15 and the second waveplate 20. Moreover, the upper surfaces of the first mirror 25, the first waveplate 15, and the second waveplate 20 may be planar to each other or they may be different from one another, according to various examples.

The magneto-optical trap chamber 10 comprises a prism 30 extending from the first mirror 25 and positioned between the first waveplate 15 and the second waveplate 20. In an example, the prism 30 may comprise borosilicate glass and may comprise any suitable size or configuration. For example, the prism 30 may contain an irregular pentagon shape. The dimensions and configuration of the prism 30 may be dependent on three degrees of freedom: the height and width of the allowable magneto-optical trap cross-section and the thickness of the glass walls. According to an example, the prism 30 may have an elongated and angled structure that extends from the first mirror 25 in a cantilever manner. The prism 30 may be adhered to the first mirror 25 using glue, epoxy, or any other suitable bonding connection material or device.

The DBC chip 40 may be a MEMS shutter chip, which permits rubidium atoms 140 to travel from an alkali metal dispenser 135 to the magneto-optical trap chamber 10 when a small voltage is applied. The magneto-optical trap chamber 10 comprises a second mirror 35 positioned under the first waveplate 15, the second waveplate 20, the first mirror 25, and the prism 30. The second mirror 35 may comprise any suitable shape and size. In an example, the second mirror 35 may be configured as a substantially flat octagonal-shaped plate having a thickness less than the thickness of any of the first waveplate 15, the second waveplate 20, the first mirror 25, and the prism 30. Moreover, the second mirror 35 may be configured to accommodate each of the first waveplate 15, the second waveplate 20, the first mirror 25, and the prism 30 thereon. In another example, the first waveplate 15 may be positioned offset and adjacent to the second mirror 35 such that the first waveplate 15 is not positioned on the second mirror 35. The first waveplate 15, the second waveplate 20, the first mirror 25, and the prism 30 may be adhered to the second mirror 35 using glue, epoxy, or any other suitable bonding connection material or device, according to various examples.

The system 100 further comprises an electric circuit 120 operatively connected to the DBC chip 40. The electric circuit 120 may comprise any suitable arrangement of typical electric circuit components used to transmit current therethrough and to connected devices. The DBC chip 40 comprises a wire 125 that produces a gradient magnetic field M when supplied with current from the electric circuit 120. The DBC chip 40 may be wired to a power source 145 via direct or indirect connection through the electric circuit 120. The system 100 further comprises a vacuum pump 130 attached to the magneto-optical trap chamber 10. The vacuum pump 130 may be any suitable type of vacuum pump used to remove various gasses from the magneto-optical trap chamber 10. In an example, a glass-to-metal seal (not shown) may provide a connection between the vacuum pump 130 and the magneto-optical trap chamber 10.

The system 100 further comprises an alkali metal dispenser 135 to regulate a flow of rubidium atoms 140 to the magneto-optical trap chamber 10. According to an example, a small slice of rubidiated graphite may be placed behind the alkali metal dispenser 135. The six output light beams 115 are generated by the selective dispersion of the single input light beam 110 from the prism 30 and reflected by the first mirror 25, the second mirror 35, and the second waveplate 20. The magneto-optical trap chamber 10 may be placed in a larger apparatus 150 for conducting experiments using cold atoms. The apparatus 150 may comprise several larger magnetic coils 151 to apply a bias filed and lasers for trapping the rubidium atoms 140 and observation thereof. Once the magneto-optical trap chamber 10 holds Ultra High Vacuum (UHV), generally around $10^{-11}$ Torr, the rubidium atoms 140 are permitted to enter the magneto-optical trap chamber 10 by a applying a voltage to the alkali metal dispenser 135. In an example, the voltage may be approximately five volts. This causes the rubidium atoms 140 to drift into the cross-section of the magneto-optical trap chamber 10 formed by single input light beam 110 and are then trapped there by the magnetic field M from the DBC chip 40 and the larger coils 151. At this point, the rubidium atoms 140 may be manipulated or observed at will.

The magneto-optical trap chamber 10 is highly scalable and customizable to allow for easier manufacturing. The dimensions and configurations of the magneto-optical trap chamber 10 may be dependent on three-degrees of freedom, but these can be scaled independently. Other changes to components in the magneto-optical trap chamber 10 may be dependent on the wavelength of the single input light beam 110 produced by the light source 105. The DBC chip 40 is also highly customizable, allowing for as many wire configurations as can be desired and fabricated. Furthermore, different wire configurations can manipulate the trapped rubidium atoms 140 in different ways.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Those skilled in the art will recognize that the embodiments herein can be practiced with modification within the spirit and scope of the appended claims.

What is claimed is:

1. A magneto-optical trap chamber comprising:
a first waveplate;
a second waveplate spaced apart from the first waveplate;
a first mirror positioned between the first waveplate and the second waveplate;
a prism extending from the first mirror and positioned between the first waveplate and the second waveplate; and
a second mirror positioned under the first waveplate, the second waveplate, the first mirror, and the prism.

2. The magneto-optical trap chamber of claim 1, wherein the first waveplate comprises a quarter-waveplate.

3. The magneto-optical trap chamber of claim 1, wherein the first waveplate is configured to polarize light.

4. The magneto-optical trap chamber of claim 1, wherein the second waveplate comprises a quarter-waveplate.

5. The magneto-optical trap chamber of claim 1, wherein the second waveplate comprises a reflective surface.

6. The magneto-optical trap chamber of claim 1, wherein the second mirror comprises a direct bonded copper (DBC) chip.

7. The magneto-optical trap chamber of claim 1, wherein the first waveplate and the second waveplate are parallel to each other.

8. The magneto-optical trap chamber of claim 1, wherein the first mirror is orthogonal to each of the first waveplate and the second waveplate.

9. The magneto-optical trap chamber of claim 1, wherein a longitudinal axis of the prism is parallel to each of the first waveplate and the second waveplate.

10. The magneto-optical trap chamber of claim 9, wherein the longitudinal axis of the prism is orthogonal to the first mirror.

11. The magneto-optical trap chamber of claim 1, wherein the prism comprises a first end and a second end, wherein the first end is connected to the first mirror, and wherein the second end is connected to the second mirror.

12. The magneto-optical trap chamber of claim 1, wherein the prism extends from the first mirror to the second mirror at an acute angle.

13. The magneto-optical trap chamber of claim 1, wherein the prism comprises an anti-reflective surface.

14. A system comprising:
a light source to generate a single input light beam; and
a magneto-optical trap chamber to receive the single input light beam and generate six output light beams, wherein the magneto-optical trap chamber comprises:
a first waveplate to polarize the single input light beam;
a second waveplate comprising a reflective surface and spaced apart from the first waveplate;
a first mirror positioned between the first waveplate and the second waveplate;
a prism extending from the first mirror and positioned between the first waveplate and the second waveplate; and
a direct bonded copper (DBC) chip comprising a second mirror positioned under the first waveplate, the second waveplate, the first mirror, and the prism.

15. The system of claim 14, wherein the prism directs the single input light beam towards the first mirror and the second mirror.

16. The system of claim 14, further comprising an electric circuit operatively connected to the DBC chip.

17. The system of claim 16, wherein the DBC chip comprises a wire that produces a gradient magnetic field when supplied with current from the electric circuit.

18. The system of claim 14, further comprising a vacuum pump attached to the magneto-optical trap chamber.

19. The system of claim 14, further comprising an alkali metal dispenser to regulate a flow of rubidium atoms to the magneto-optical trap chamber.

20. The system of claim 14, wherein the six output light beams are generated by the selective dispersion of the single input light beam from the prism and reflected by the first mirror, the second mirror, and the second waveplate.

* * * * *